US006837108B2

(12) United States Patent
Platt

(10) Patent No.: US 6,837,108 B2
(45) Date of Patent: Jan. 4, 2005

(54) INCREASING THE DYNAMIC RANGE OF A MEMS GYROSCOPE

(75) Inventor: William P. Platt, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 216 days.

(21) Appl. No.: 10/128,071

(22) Filed: Apr. 23, 2002

(65) Prior Publication Data
US 2003/0196491 A1 Oct. 23, 2003

(51) Int. Cl.[7] .................... G01P 15/125; G01R 15/09
(52) U.S. Cl. ................. 73/504.16; 73/504.12; 73/504.32; 324/115
(58) Field of Search .................... 73/504.02, 504.12, 73/504.16, 1.37, 1.38, 1.77, 504.32; 324/115

(56) References Cited

U.S. PATENT DOCUMENTS

| 4,105,967 | A | * | 8/1978 | Macemon | 324/115 |
| 4,848,158 | A | * | 7/1989 | Egli et al. | 73/514.39 |
| 4,977,367 | A | * | 12/1990 | Johnston | 324/115 |
| 5,481,914 | A | | 1/1996 | Ward | 73/504.16 |
| 5,597,955 | A | * | 1/1997 | Leger et al. | 73/504.16 |
| 5,672,949 | A | | 9/1997 | Ward | 318/609 |
| 5,747,690 | A | * | 5/1998 | Park et al. | 73/504.12 |
| 5,783,973 | A | | 7/1998 | Weinberg et al. | 331/35 |
| 6,064,169 | A | | 5/2000 | Ward et al. | 318/646 |
| 6,250,156 | B1 | * | 6/2001 | Seshia et al. | 73/504.12 |
| 6,301,963 | B1 | * | 10/2001 | Park | 73/504.12 |
| 6,311,555 | B1 | | 11/2001 | McCall et al. | 73/488 |
| 6,467,346 | B1 | * | 10/2002 | Challoner et al. | 73/504.02 |
| 2002/0134154 | A1 | * | 9/2002 | Hsu et al. | 73/504.04 |

FOREIGN PATENT DOCUMENTS

| EP | 0 492 739 A2 | 7/1992 | G01P/3/44 |
| EP | 1 098 170 A2 | 5/2001 | G01C/19/56 |
| JP | 60-222715 | 7/1985 | G01C/19/56 |
| JP | 2001-153659 | 8/2001 | G01C/19/56 |
| WO | WO 02/10678 | 2/2002 | G01B/9/04 |

OTHER PUBLICATIONS

International Search Report for PCT/US03/12570 mailed Dec. 22, 2003.
White, Robert D. "Effects of Impact and Vibration on the Performance of a Micromachined Tuning Fork Gyroscope" Massachusetts Institute of Technology 1999.

* cited by examiner

Primary Examiner—Hezron Williams
Assistant Examiner—John C Hanley
(74) Attorney, Agent, or Firm—McDonnell Boehnen Hulbert & Berghoff LLP

(57) ABSTRACT

A MEMS gyroscope system and method for increasing a dynamic range of the MEMS gyroscope is provided. By adjusting a scale factor of the MEMS gyroscope, the highest sensed rate will be increased, which increases the dynamic range. The scale factor may be adjusted by using a variable sense bias and/or an automatic gain control loop in sense electronics.

33 Claims, 4 Drawing Sheets

INCREASING THE DYNAMIC RANGE OF A MEMS GYROSCOPE

FIELD

The present invention relates generally to microelectromechanical system (MEMS) gyroscopes, and more particularly, relates to increasing the dynamic range of a MEMS gyroscope.

BACKGROUND

Microelectromechanical systems (MEMS) integrate electrical and mechanical devices on the same silicon substrate using microfabrication technologies. The electrical components are fabricated using integrated circuit processes, while the mechanical components are fabricated using micromachining processes that are compatible with the integrated circuit processes. This combination makes it possible to fabricate an entire system on a chip using standard manufacturing processes.

One common application of MEMS is the design and manufacture of sensor devices. The electro-mechanical portion of the device provides the sensing capability, while the electronic portion processes the information obtained by the electro-mechanical portion. One example of a MEMS sensor is a MEMS gyroscope.

A type of MEMS gyroscope uses a vibrating element to sense angular rate through the detection of a Coriolis acceleration. The vibrating element is put into oscillatory motion in the X-axis (drive plane), which is parallel to the substrate. Once the vibrating element is put in motion, it is capable of detecting angular rates induced by the substrate being rotated about the Z-axis (input plane), which is parallel to the substrate. The Coriolis acceleration occurs in the Y-axis (sense plane), which is perpendicular to both the X-axis and the Z-axis. The Coriolis acceleration produces a motion that has an amplitude that is proportional to the angular rotation rate of the substrate.

The dynamic range of an angular rate sensor device is the ratio of the highest sensed rate to the lowest sensed rate. A large dynamic range is usually desirable as long as the resolution of the sensor device is not compromised. The highest sensed angular rate for some MEMS vibratory gyroscopes may be approximately 1000 degrees/second, which limits the dynamic range of the device.

The scale factor of the sensor device is the ratio of the change in output to a unit change of the input. For example, if the scale factor of a MEMS gyroscope is set at 0.0025 volts/degree/second for a MEMS gyroscope with an operating voltage of 2.5 volts, and the angular rate input is 1000 degrees/second, then the output of the MEMS gyroscope will be 2.5 volts. If the highest sensed angular rate for the MEMS vibratory gyroscope is 1000 degrees/second and the angular rate goes above 1000 degrees/second, the output of the MEMS gyroscope will remain at 2.5 volts. There are many applications, such as an Inertial Measurement Unit for smart munitions, which require the MEMS gyroscope to have a larger dynamic range.

Therefore, it would be desirable to increase the dynamic range of a MEMS gyroscope. By adjusting the scale factor of the MEMS gyroscope, the highest sensed angular rate may be increased, thereby increasing the dynamic range of the device.

SUMMARY

According to a first embodiment, a system and method for increasing a dynamic range of a MEMS gyroscope is presented. The MEMS gyroscope includes at least one sense plate. Sense electronics are connected to the at least one sense plate. A variable sense bias operable to apply a sense bias voltage is also connected to the at least one sense plate. The sense electronics provides an angular rate output. A maximum value of the angular rate output can be adjusted by changing the sense bias voltage, thereby increasing the dynamic range of the MEMS gyroscope.

According to a second embodiment, a system and method for increasing the dynamic range of the MEMS gyroscope is presented. The MEMS gyroscope includes the at least one sense plate. The sense electronics are connected to the at least one sense plate. The sense electronics provides the angular rate output. The sense electronics includes a gain. The gain is part of an automatic gain control loop. The automatic gain control loop is a feedback loop formed by connections between the gain, FET switches, and a microprocessor. The maximum value of the angular rate output can be adjusted by changing the gain of the automatic gain control loop, thereby increasing the dynamic range of the MEMS gyroscope.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
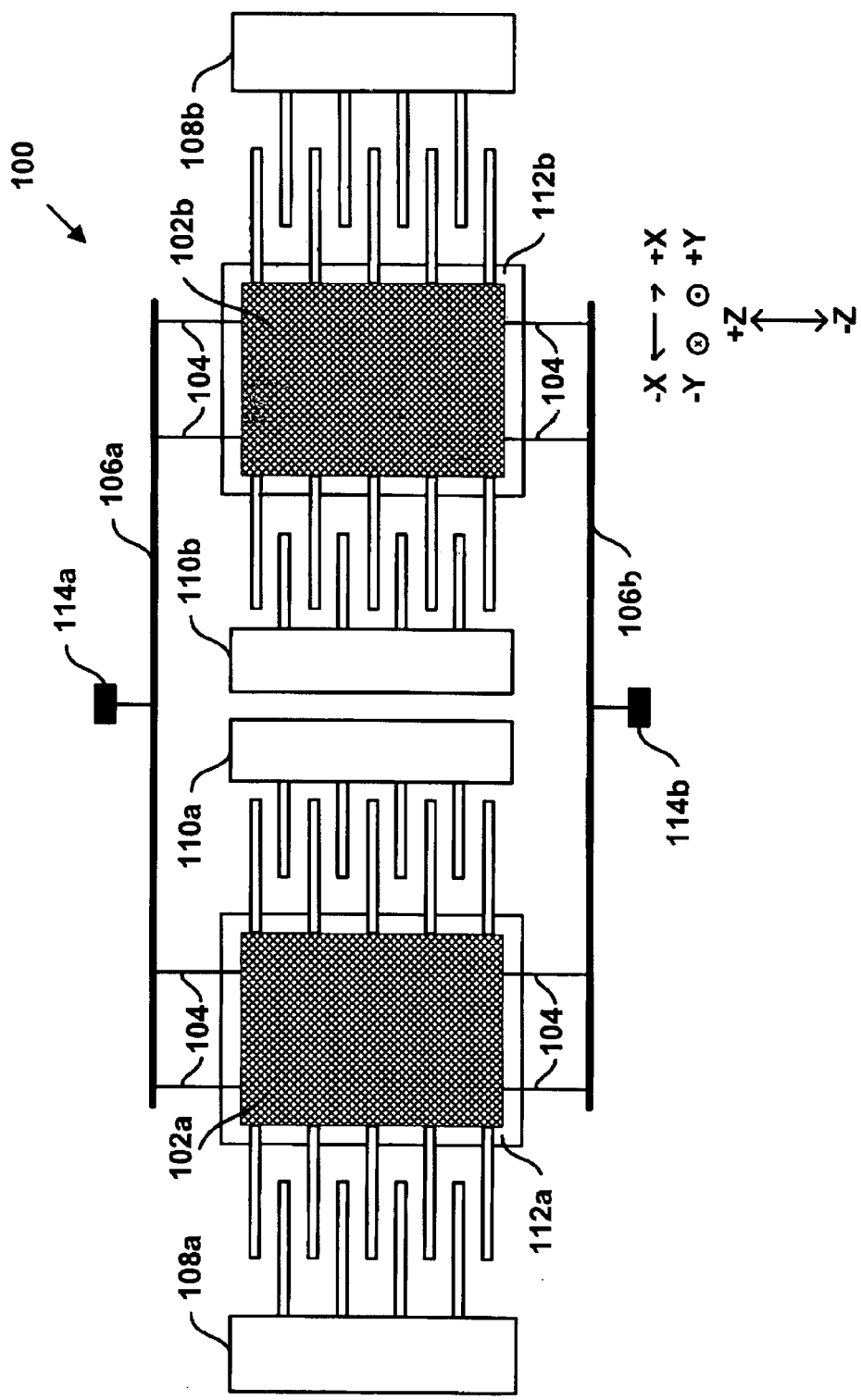
FIG. 1 is a plan view of a MEMS gyroscope, according to an exemplary embodiment.

FIG. 1 shows a plan view of a microelectromechanical system (MEMS) gyroscope 100 according to an exemplary embodiment. While FIG. 1 shows the MEMS gyroscope 100 as a tuning fork gyroscope, other MEMS vibratory gyroscopes that use a Coriolis acceleration to detect rotation, such as an angular rate sensing gyroscope, may also be used. The MEMS gyroscope 100 may be formed on a substrate and may include at least one proof mass 102a, 102b; a plurality of support beams 104; at least one cross beam 106a, 106b; at least one motor drive comb 108a, 108b; at least one motor pickoff comb 110a, 110b; at least one sense plate 112a, 112b; and at least one anchor 114a, 114b.

The at least one proof mass 102a, 102b may be any mass suitable for use in a MEMS gyroscope system. In a preferred embodiment, the at least one proof mass 102a, 102b is a plate of silicon. Other materials that are compatible with micromachining techniques may also be employed. FIG. 1 shows two proof masses; however, one or more proof masses may be employed.

The at least one proof mass 102a, 102b may be located substantially between the at least one motor drive comb 108a, 108b and the at least one motor pickoff comb 110a, 110b. The at least one proof mass 102a, 102b may contain a plurality of comb-like electrodes extending towards both the at least one motor drive comb 108a, 108b and the at least one motor pickoff comb 110a, 110b. While the at least one proof mass 102a, 102b has ten electrodes as depicted in FIG. 1, the number of electrodes on the at least one proof mass 102a, 102b may be more or less than ten.

The at least one proof mass 102a, 102b may be supported above the at least one sense plate 112a, 112b by the plurality of support beams 104. While eight support beams 104 are depicted in FIG. 1, the number of support beams used may be more or less than eight. The plurality of support beams 104 may be beams micromachined from a silicon wafer. The plurality of support beams 104 may act as springs allowing the at least one proof mass 102a, 102b to move within the drive plane (X-axis) and the sense plane (Y-axis). (See FIG. 1 for axis information.)

The plurality of support beams 104 may be connected to at least one cross beam 106a, 106b. The at least one cross beam 106a, 106b may be connected to at least one anchor 114a, 114b providing support for the MEMS gyroscope 100. The at least one anchor 114a, 114b may be connected to the underlying substrate. While two anchors 114a, 114b are depicted in FIG. 1, the number of anchors may be more or less than two. The at least one anchor 114a, 114b may be positioned along the at least one cross beam 106a, 106b in any manner that provides support to the MEMS gyroscope 100.

The at least one motor drive comb 108a, 108b may include a plurality of comb-like electrodes extending towards the at least one proof mass 102a, 102b. While the at least one motor drive comb 108a, 108b has four electrodes as depicted in FIG. 1, the number of electrodes on the at least one motor drive comb 108a, 108b may be more or less than four. The number of the electrodes on the at least one motor drive comb 108a, 108b may be determined by the number of electrodes on the at least one proof mass 102a, 102b.

The plurality of interdigitated comb-like electrodes of the at least one proof mass 102a, 102b and the at least one motor drive comb 108a, 108b may form capacitors. The at least one motor drive comb 108a, 108b may be connected to drive electronics, not shown in FIG. 1. The drive electronics may cause the at least one proof mass 102a, 102b to oscillate at substantially a tuning fork frequency along the drive plane (X-axis) by using the capacitors formed by the plurality of interdigitated comb-like electrodes of the at least one proof mass 102a, 102b and the at least one motor drive comb 108a, 108b.

The at least one motor pickoff comb 110a, 110b may include a plurality of comb-like electrodes extending towards the at least one proof mass 102a, 102b. While the at least one motor pickoff comb 110a, 110b has four electrodes as depicted in FIG. 1, the number of electrodes on the at least one motor pickoff comb 110a, 110b may be more or less than four. The number of the electrodes on the at least one motor pickoff comb 110a, 110b may be determined by the number of electrodes on the at least one proof mass 102a, 102b.

The plurality of interdigitated comb-like electrodes of the at least one proof mass 102a, 102b and the at least one motor pickoff comb 110a, 110b may form capacitors, which may allow the MEMS gyroscope 100 to sense motion in the drive plane (X-axis).

The at least one sense plate 112a, 112b may form a parallel capacitor with the at least one proof mass 102a, 102b. If an angular rate input is applied to the MEMS gyroscope 100 along the input plane (Z-axis) while the at least one proof mass 102a, 102b is oscillating along the drive plane (X-axis), a Coriolis force may be detected as a displacement or motion in the sense plane (Y-axis). The parallel capacitor may be used to sense the displacement or motion in the sense plane (Y-axis).

The output of the MEMS gyroscope 100 may be a signal proportional to the change in capacitance. The signal may be a current if a sense bias voltage is applied to the at least one sense plate 112a, 112b. The at least one sense plate 112a, 112b may be connected to sense electronics, not shown in FIG. 1. The sense electronics may detect the change in capacitance as the at least one proof mass 102a, 102b moves towards and/or away from the at least one sense plate 112a, 112b.

First Embodiment

Figure 2:
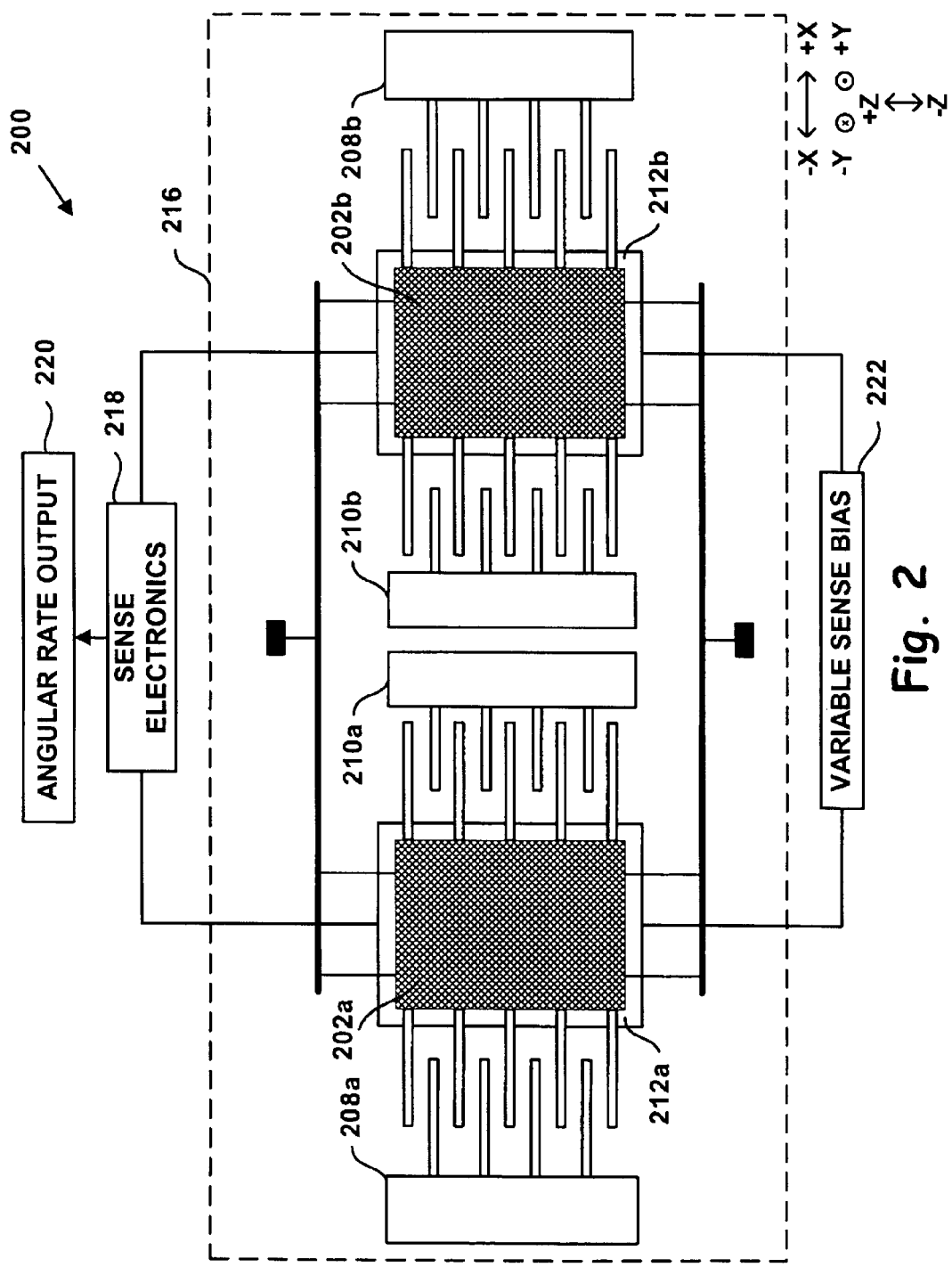
FIG. 2 is a plan view of a MEMS gyroscope system, according to an exemplary embodiment.

FIG. 2 shows a plan view of a MEMS gyroscope system 200. The MEMS gyroscope system 200 may include a MEMS gyroscope 216, sense electronics 218, and a variable sense bias 222. The MEMS gyroscope system 200 may also include drive electronics, a system power source, and other typical operational electronics, which are not shown in FIG. 2 for simplification. The MEMS gyroscope 216 may be substantially the same as the MEMS gyroscope 100 as depicted in FIG. 1.

The sense electronics may be connected to the at least one sense plate 212a, 212b. The sense electronics 218 may be any combination of signal conditioning electronic circuitry operable to convert an AC current to a DC voltage. The sense electronics 218 may be operable to convert a current created by the change in capacitance as the at least one proof mass 202a, 202b moves towards and/or away from that at least one sense plate 212a, 212b to a DC voltage that is proportional to the angular rate input detected by the MEMS gyroscope 216.

An angular rate output 220 may be an output of the sense electronics 218. The angular rate output 220 may be the DC voltage that is proportional to the angular rate input detected by the MEMS gyroscope 216. A scale factor of the MEMS gyroscope 216 may limit a maximum value of the angular rate output 220. The scale factor may be a correlation between the angular rate input detected by the MEMS gyroscope 216 and the DC signal related to the angular rate output 220. The scale factor may be proportional to a sense bias voltage applied to the at least one sense plate 212a, 212b. For example, the sense bias voltage for a typical MEMS gyroscope may be +/−5 volts. By changing the sense bias voltage, the scale factor may be modified.

The maximum value of the angular rate output 220 may limit the dynamic range of the MEMS gyroscope system 200. For example, if the angular rate output 220 has a maximum voltage of 2.5 volts, the scale factor is 0.0025 volts/degrees/second, and an angular rate input more than 1000 degrees/second is subjected to the MEMS gyroscope, any angular rate input above 1000 degrees/second may also produce an output of 2.5 volts.

The variable sense bias 222 may be a device or combination of devices operable to apply a variable sense bias voltage to the at least one sense plate 212a, 212b. For example, the variable sense bias 222 may be a set of switches connected to a variable power supply. By providing the variable sense bias 222, the sense bias voltage may be adjusted based on the angular rate input to the MEMS gyroscope 216. For example, the variable sense bias 222 may be operable to apply a range of voltages from +5 volts to −5 volts.

For example, the sense bias voltage may be substantially +/−5 volts when the angular rate input is less than 1000 degrees/second. However, the sense bias voltage may be changed by the variable sense bias 222 when the angular rate input is substantially above 1000 degrees/second. By changing the sense bias voltage, the scale factor may be changed, thereby allowing the MEMS gyroscope to detect angular rate inputs above 1000 degrees/second, which increases the dynamic range of the MEMS gyroscope 216.

Second Embodiment

Figure 3:
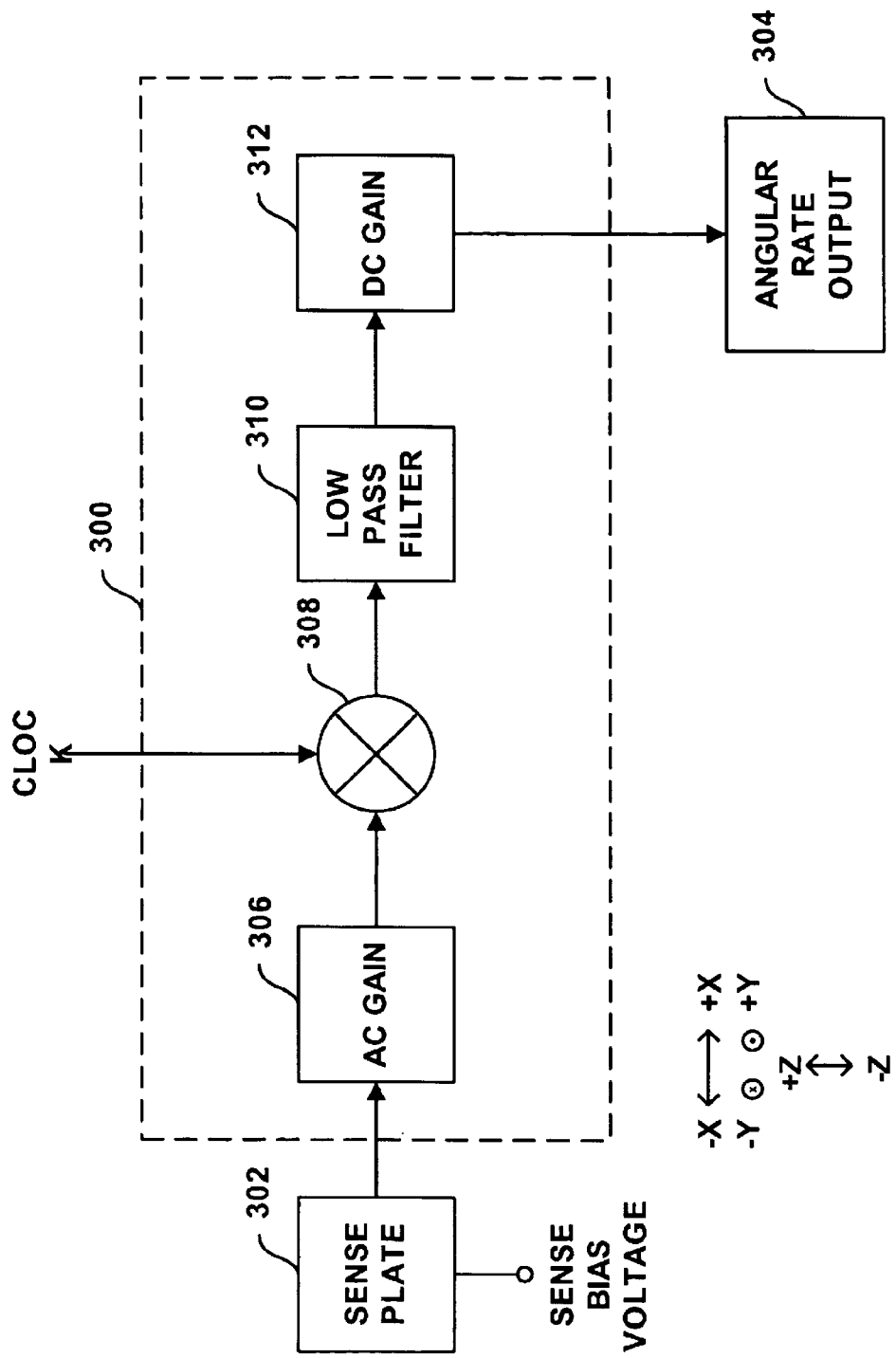
FIG. 3 is a simplified block diagram of sense electronics, according to an exemplary embodiment.

FIG. 3 is a simplified block diagram of sense electronics 300. The sense electronics 300 may provide signal conditioning operable to convert an output of the MEMS gyroscope 100 (see FIG. 1) to a signal that may be used by other electronic devices, such as an inertial measurement unit. The sense electronics 300 may also be operable to perform other functions, such as providing feedback signals to the drive electronics.

The sense electronics 300 may include an AC gain 306, a demodulator 308, a low pass filter 310, and a DC gain 312. Components of the sense electronics 300 are represented by simple shapes to demonstrate that a variety of different electronic devices or combination of devices may be used for each of the components included in the sense electronics 300. Additional circuitry not depicted in FIG. 3 may also be included in the sense electronics 300.

An input to the sense electronics 300 may be a current created by the change in capacitance as the at least one proof mass 102a, 102b moves towards and/or away from the at least one sense plate 112a, 112b. Sense plate 302 may be substantially the same as the at least one sense plate 112a, 112b of the MEMS gyroscope 100. While only one sense plate is depicted in FIG. 3, the sense electronics 300 may be replicated for each additional sense plate used in the MEMS gyroscope 100. Alternatively, the sense electronics 300 may be designed to provide signal conditioning for more than one sense plate.

The AC gain 306 may be any device operable to convert a current to an AC voltage. The AC gain 306 may be an operational amplifier with feedback resistance and capacitance. However, other types of amplifiers may be used. The AC gain 306 may be operable to convert the detected current from the output of the sense plate 302 to an AC voltage. The AC gain 306 may integrate the current and amplify the result of the integration, producing the AC voltage.

The demodulator 308 may be any device operable to multiply the output of the AC gain 306 with a clock signal. The clock signal may be generated by the drive electronics and may be substantially at the tuning fork frequency of the at least one proof mass 102a, 102b. The demodulator 308 may convert the output of the AC gain 306 to a DC voltage. The DC voltage may be proportional to the angular rate input detected by the MEMS gyroscope 100.

The low pass filter 310 may be used to set a break frequency. By using a low pass filter 310, unwanted signals with higher frequencies may be blocked. For example, by setting the break frequency at 100 Hertz, the sense electronics 300 will only allow signals with frequencies at or below 100 Hertz to be passed through the filter 310 to the DC gain 312.

The DC gain 312 may amplify the output of the low pass filter 310. The DC gain 312 may be an operational amplifier with feedback resistance and capacitance. However, other types of amplifiers may be used. An output of the DC gain 312 may be an angular rate output 304.

The angular rate output 304 may be proportional to the angular rate input detected by the MEMS gyroscope 100. However, the angular rate output 304 may be limited by the scale factor of the MEMS gyroscope 100. For example, if the angular rate output 304 has a maximum voltage of 2.5 volts, the scale factor is 0.0025 volts/degrees/second, and an angular rate input more than 1000 degrees/second, then any angular rate inputs above 1000 degrees/second may also produce an angular rate output signal of 2.5 volts. In this example, the output signal of the MEMS gyroscope would not change above 1000 degrees/second, making the sensor essentially non-functional.

By adjusting the scale factor, the MEMS gyroscope 100 may be able to detect an angular rate input greater than 1000 degrees/second. An automatic gain control loop operable to change an output of the AC gain 306 and/or the DC gain 312 may be used to adjust the scale factor.

Figure 4:
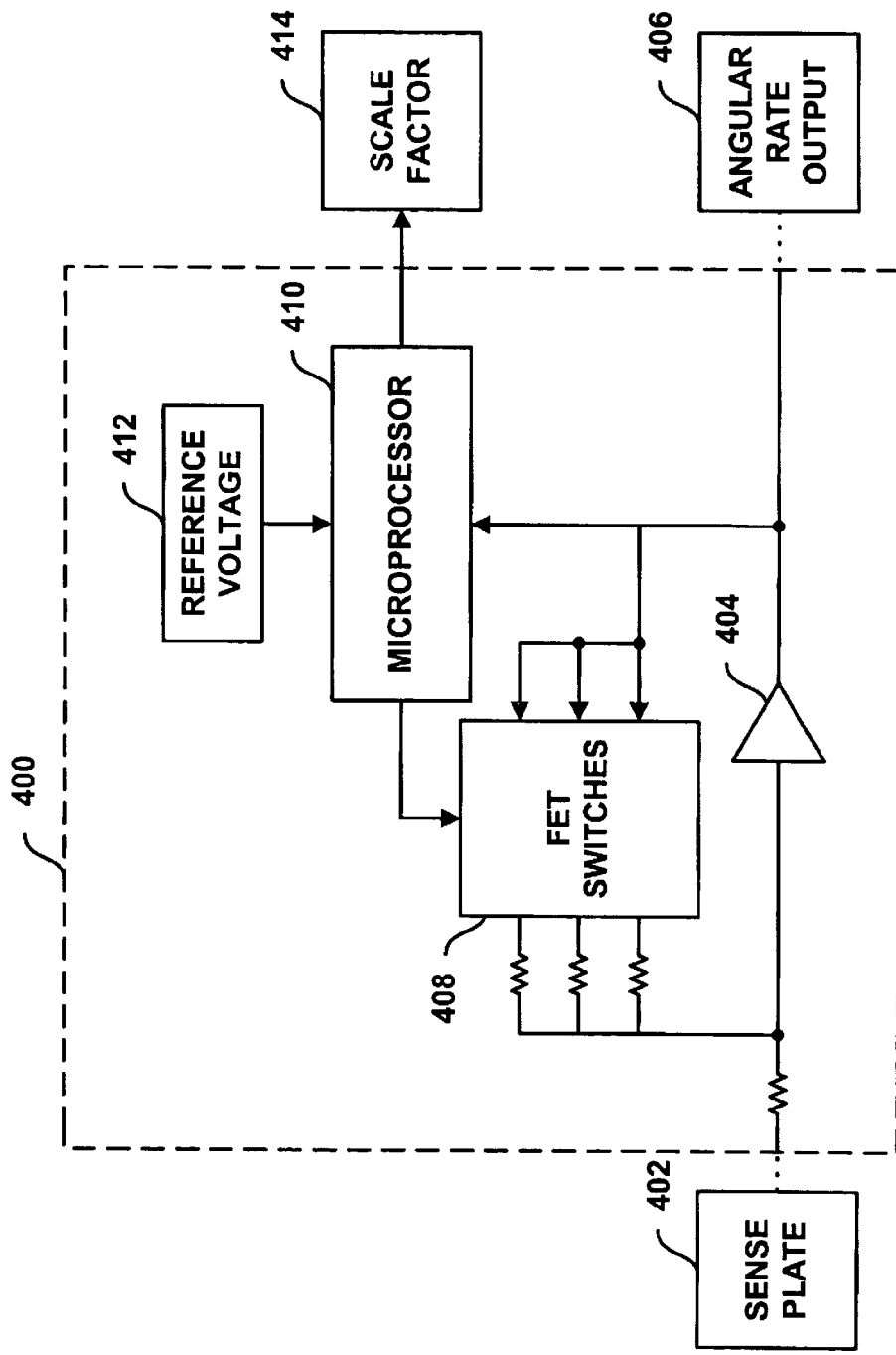
FIG. 4 is a schematic of an automatic gain control loop, according to an exemplary embodiment.

FIG. 4 is a schematic of an automatic gain control loop 400. The automatic gain control loop 400 may be integrated into the AC gain 306 or DC gain 312. In a preferred embodiment, the automatic gain control loop 400 may be integrated into the DC gain 312. The automatic gain control loop 400 may be a feedback loop formed by connections between a gain 404, field effect transistor (FET) switches 408, and a microprocessor 410. The gain 404 is substantially the same as the AC gain 306 or the DC gain 312 as depicted in FIG. 3. The FET switches 408 may be a DG201 analog switch available from Vishay Siliconix or other integrated circuit manufacturers.

Sense plate 402 may be substantially the same as the at least one sense plate 112a, 112b of the MEMS gyroscope 100 (see FIG. 1). If the gain 404 is substantially the same as the AC gain 306, an output of the sense plate 402 may be connected to an input of the gain 404 through a resistor. However, if the gain 404 is substantially the same as the DC gain 312, there may be additional signal conditioning components between the sense plate 402 and the gain 404.

Angular rate output 406 may be substantially the same as the angular rate output 304 depicted in FIG. 3. If the gain 404 is substantially the same as the DC gain 312, an output of the gain 404 may provide the angular rate output 406. However, if the gain 404 is substantially the same as the AC gain 306, there may be additional signal conditioning performed on the output of the gain 404 prior to the angular rate output 406.

An output of the gain 404 may be connected to the microprocessor 410 and to the FET switches 408. The microprocessor 410 may be operable to detect a voltage level at the output of the gain 404. The voltage level may be an AC voltage level if the gain 404 is substantially the same as the AC gain 306, or a DC voltage level if the gain 404 is substantially the same as the DC gain 312.

The microprocessor 410 may compare the output of the gain 404 with a reference voltage 412. The reference voltage 412 may be substantially the same as the sense bias voltage. In a typical MEMS gyroscope system, the sense bias voltage may be ±5 volts. However, other reference voltages may be used. For example, the reference voltage may be the sense bias voltage produced by the variable sense bias 222 of the MEMS gyroscope system 200 shown in FIG. 2.

An output of the microprocessor 410 may be connected to an input of the FET switches 408. If the microprocessor 410 determines that the scale factor requires adjustment to allow detection of the angular rate input, the microprocessor 410 may be operable to open and close each of the FET switches 408. By selecting which of the switches to open and to close, the microprocessor 410 may control the value of the scale factor.

The FET switches 408 may be connected to an input of the gain 404 through resistors. A feedback resistance of the gain 404 may be determined by which of the FET switches 408 are open and which of the FET switches 408 are closed. For example, the feedback resistance may be 100 times greater with all the switches closed than when all the switches are opened. The output of the gain 404 may be determined by an amount of feedback resistance. As the output of the gain 404 is adjusted, the microprocessor 410 detects the change and the feedback loop is repeated.

The microprocessor 410 may also provide a scale factor output 414. The scale factor output 414 may be a digital signal that transmits the scale factor value to another device. The scale factor output 414 may be changed as the automatic gain control loop 400 adjusts the output of the gain 404. For example, the microprocessor 410 may transmit the scale factor output 414 to an inertial measurement unit.

By providing the automatic gain control loop 400, the scale factor may be adjusted based on the angular rate input to the MEMS gyroscope 100. For example, the scale factor may be reduced when the angular rate input is above 1000 degrees/second. By adjusting the scale factor, the dynamic range of the MEMS gyroscope 100 may be increased. The automatic gain control loop 400 may also be used in conjunction with the variable sense bias 222 of the MEMS gyroscope system 200.

It should be understood that the illustrated embodiments are exemplary only and should not be taken as limiting the scope of the present invention. While a MEMS tuning fork gyroscope is employed to illustrate the invention, the present invention also applies to other MEMS vibratory gyroscopes that use the Coriolis acceleration to detect rotation and to any device that includes a MEMS vibratory gyroscope. The claims should not be read as limited to the described order or elements unless stated to that effect. Therefore, all embodiments that come within the scope and spirit of the following claims and equivalents thereto are claimed as the invention.

The embodiments of the invention in which an exclusive property or right is claimed are defined as follows:

1. A method for increasing a dynamic range of a MEMS gyroscope, comprising in combination:
   connecting a variable sense bias to at least one sense plate of the MEMS gyroscope, wherein the variable sense bias is operable to apply a sense bias voltage to the at least one sense plate; and
   adjusting the sense bias voltage to change a scale factor of the MEMS gyroscope based on an angular rate input detected by the MEMS gyroscope.

2. The method of claim 1, wherein the variable sense bias is a set of switches connected to a variable power supply.

3. A method for increasing a dynamic range of a MEMS gyroscope, comprising in combination:
   detecting an output of a gain located in sense electronics, wherein the sense electronics are connected to a MEMS gyroscope;
   comparing the output of the gain with a reference voltage;
   adjusting the output of the gain, wherein adjusting the output of the gain adjusts a scale factor of the MEMS gyroscope, wherein the scale factor is adjusted based on an angular rate input detected by the MEMS gyroscope.

4. The method of claim 3, further comprising providing a scale factor output.

5. The method of claim 3, wherein the output of the gain is connected to FET switches and a microprocessor.

6. The method of claim 5, wherein the microprocessor is operable to detect a voltage level at the output of the gain.

7. The method of claim 6, wherein the microprocessor is operable to compare the voltage level at the output of the gain with the reference voltage.

8. The method of claim 5, wherein the FET switches are connected to an input of the gain through resistors.

9. The method of claim 8, wherein the microprocessor is operable to open and close the FET switches.

10. The method of claim 9, wherein the output of the gain is determined by which of the FET switches are open and which of the FET switches are closed.

11. A system for increasing a dynamic range of a MEMS gyroscope, comprising in combination:
    a MEMS gyroscope including at least one sense plate;
    sense electronics connected to the at least one sense plate, wherein the sense electronics provide an angular rate output; and
    a variable sense bias operable to apply a sense bias voltage to the at least one sense plate, wherein the sense bias voltage is adjusted to change a scale factor of the MEMS gyroscope based on an annular rate input detected by the MEMS gyroscope.

12. The system of claim 11, wherein the MEMS gyroscope is a tuning fork gyroscope.

13. The system of claim 11, wherein the MEMS gyroscope uses a Coriolis acceleration to detect an angular rate input.

14. The system of claim 11, wherein the sense electronics is operable to convert a current to a DC voltage.

15. The system of claim 14, wherein the DC voltage is proportional to the angular rate input detected by the MEMS gyroscope.

16. The system of claim 11, wherein the angular rate output is a DC voltage that is proportional to the angular rate input detected by the MEMS gyroscope.

17. The system of claim 11, wherein the variable sense bias is a set of switches connected to a variable power supply.

18. A system for increasing a dynamic range of a MEMS gyroscope, comprising in combination:
    a tuning fork gyroscope including at least one sense plate;
    sense electronics connected to the at least one sense plate, wherein the sense electronics is operable to convert a current to a DC voltage, and wherein the DC voltage is proportional to an angular rate input detected by the tuning fork gyroscope; and
    a variable sense bias operable to apply a sense bias voltage to the at least one sense plate, wherein the sense bias voltage is adjusted to change a scale factor of the MEMS gyroscope based on the angular rate input detected by the tuning fork gyroscope.

19. A system for increasing a dynamic range of a MEMS gyroscope, comprising in combination:
    a MEMS gyroscope including at least one sense plate;
    sense electronics connected to the at least one sense plate, wherein the sense electronics includes a gain; and
    an automatic gain control loop, wherein the automatic gain control loop is a feedback loop formed by connections between the gain, FET switches, and a microprocessor, wherein the automatic gain control loop adjusts an output of the gain, wherein adjusting the output of the gain adjusts a scale factor of the MEMS gyroscope, wherein the scale factor is adjusted based on an angular rate input detected by the MEMS gyroscope.

20. The system of claim 19, wherein the MEMS gyroscope is a tuning fork gyroscope.

21. The system of claim 19, wherein the MEMS gyroscope uses a Coriolis acceleration to detect an angular rate input.

22. The system of claim 19, wherein the output of the gain is connected to the FET switches and the microprocessor.

23. The system of claim 22, wherein the microprocessor is operable to detect a voltage level at the output of the gain.

24. The system of claim 23, wherein the microprocessor is operable to compare the voltage level at the output of the gain with a reference voltage.

25. The system claim 24, wherein the reference voltage is a sense bias voltage applied to the at least one sense plate.

26. The system of claim 25, wherein the sense bias voltage is produced by a variable sense bias.

27. The system of claim 26, wherein the variable sense bias is a set of switches connected to a variable power supply.

28. The system of claim 19, wherein the microprocessor is operable to open and close the FET switches, thereby controlling the scale factor of the MEMS gyroscope.

29. The system of claim 19, wherein the FET switches are connected to an input of the gain through resistors.

30. The system of claim 19, wherein the output of the gain is determined by which of the FET switches are open and which of the FET switches are closed.

31. The system of claim 19, wherein the microprocessor provides a scale factor output.

32. A system for increasing a dynamic range of a MEMS gyroscope, comprising in combination:

a tuning fork gyroscope including at least one sense plate;

sense electronics connected to the at least one sense plate, wherein the sense electronics includes a gain; and an automatic gain control loop, wherein the automatic gain control loop is a feedback loop formed by the connections between the gain, FET switches, and a microprocessor, wherein the microprocessor is operable to detect a voltage level at the output of the gain and compare the voltage level with a reference voltage, wherein the microprocessor is operable to open and close the FET switches based on the comparison, wherein opening and closing the FET switches adjusts a scale factor of the MEMS gyroscope, wherein the scale factor is adjusted based on an angular rate input detected by the MEMS gyroscope.

33. The system of claim 32, wherein the microprocessor provides a scale factor output.

* * * * *

UNITED STATES PATENT AND TRADEMARK OFFICE
CERTIFICATE OF CORRECTION

PATENT NO. : 6,837,108 B2  Page 1 of 1
DATED : January 4, 2005
INVENTOR(S) : William P. Platt It is certified that error appears in the above-identified patent and that said Letters Patent is hereby corrected as shown below:

Column 8,
Line 13, please replace "annular" with -- angular --.

Signed and Sealed this

Seventeenth Day of May, 2005

JON W. DUDAS
*Director of the United States Patent and Trademark Office*